Figure 1:
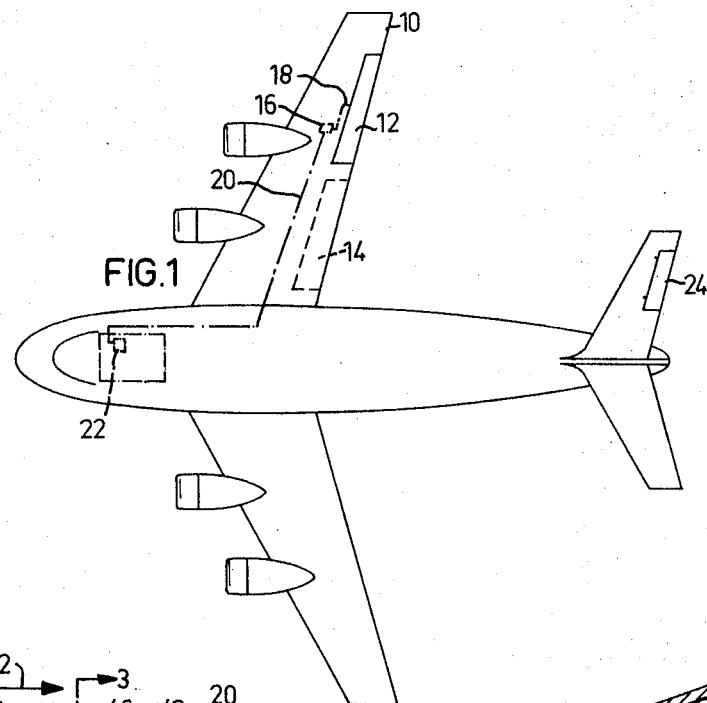

United States Patent

[11] 3,586,267

[72] Inventor Alf Martin Magnus Ingelman-Sundberg
 Smedsbacksgatan 5 VII 115 39,
 Stockholm, Sweden
[21] Appl. No. 784,424
[22] Filed Dec. 17, 1968
[45] Patented June 22, 1971
[32] Priority Dec. 22, 1967
[33] Sweden
[31] 17,700/1967

[54] ARRANGEMENT IN AND RELATING TO AIRCRAFT
 6 Claims, 9 Drawing Figs.

[52] U.S. Cl.............................................. 244/42, 244/87
[51] Int. Cl............................................... B64c 3/46, B64c 9/00
[50] Field of Search............................................ 244/42.6, 42.61, 42.62, 42.63, 44

[56] References Cited
 UNITED STATES PATENTS

| | | | |
|---|---|---|---|
| 2,011,902 | 8/1935 | Leigh | 244/42 (.6) |
| 2,369,152 | 2/1945 | Lowell et al. | 244/42 (.61) |
| 2,392,443 | 1/1946 | Youngman | 244/42 (.6) X |
| 2,427,980 | 9/1947 | Stinson et al. | 244/42 (.6) |
| 2,932,470 | 4/1960 | Edkins | 244/44 |
| 2,969,207 | 1/1961 | Fain et al. | 244/44 |
| 3,047,257 | 7/1962 | Chester | 244/42 (.61) X |
| 3,158,338 | 11/1964 | Cushman | 244/44 |

FOREIGN PATENTS

| | | | |
|---|---|---|---|
| 567,033 | 1/1945 | Great Britain | 244/42(.6) |
| 615,112 | 1/1949 | Great Britain | 244/42(.6) |

Primary Examiner—Milton Buchler
Assistant Examiner—Jeffrey L. Forman
Attorney—Young & Thompson ABSTRACT: A device for regulating the setting angle of a control surface such as a flap or rudder on an aircraft comprising an inflatable bag located between the control surface and the fuselage. Air for inflating the bag is drawn from outside the aircraft at a location where increased pressure due to dynamic pressure of the passing airstream is available. The control surface and the bag may be provided with coinciding openings therein, and a secondary flap is mounted on the control surface immediately behind said openings as viewed in the direction of the airstream. The secondary flap when raised from the control surface creates a pressure rise at the openings, thus pressurizing the openings and thereby also the interior of the bag leading to actuation of the main control surface in servo fashion.

INVENTOR.
ALF MARTIN MAGNUS INGELMAN-SUNDBERG
BY
Young & Thompson
ATTYS.

PATENTED JUN22 1971
3,586,267
SHEET 2 OF 3
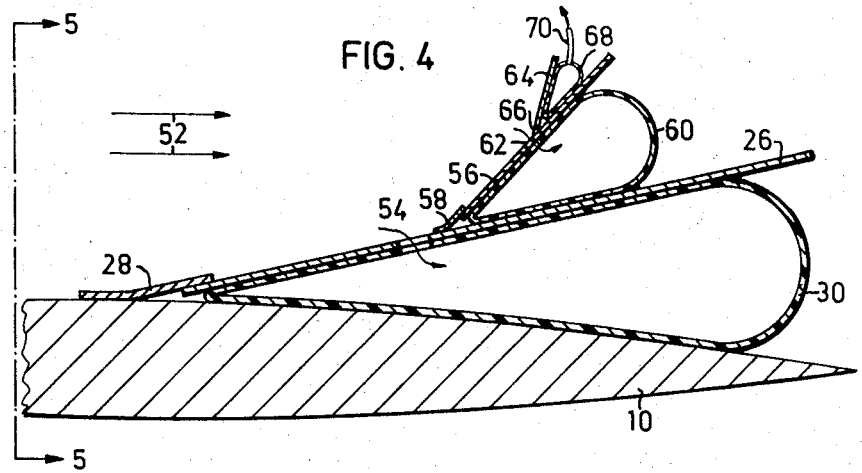
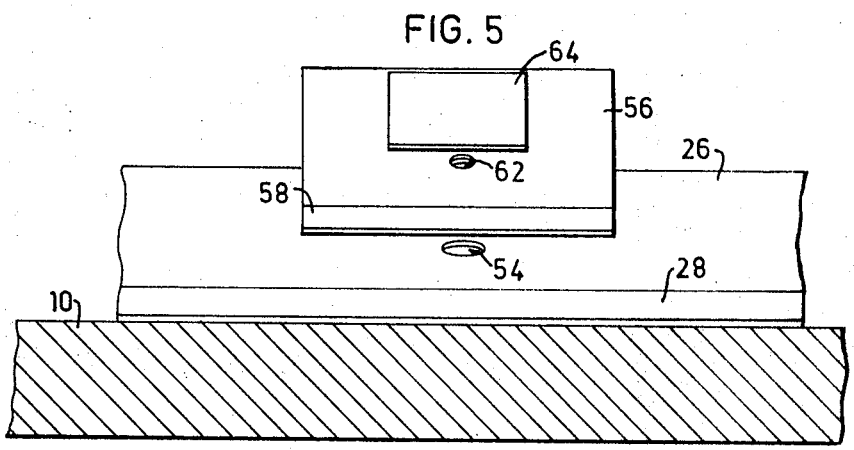
INVENTOR.
ALF MARTIN MAGNUS INGELMAN-SUNDBERG
BY
Young & Thompson
ATTYS.

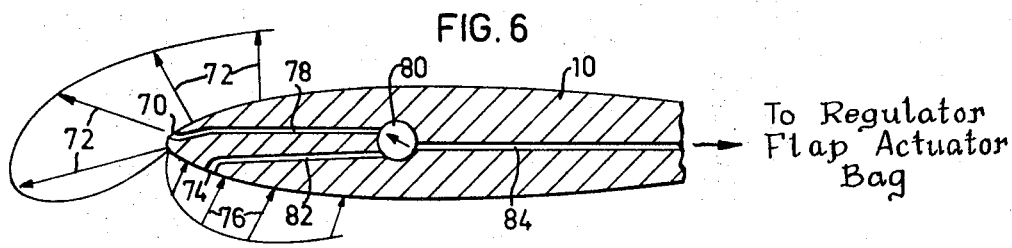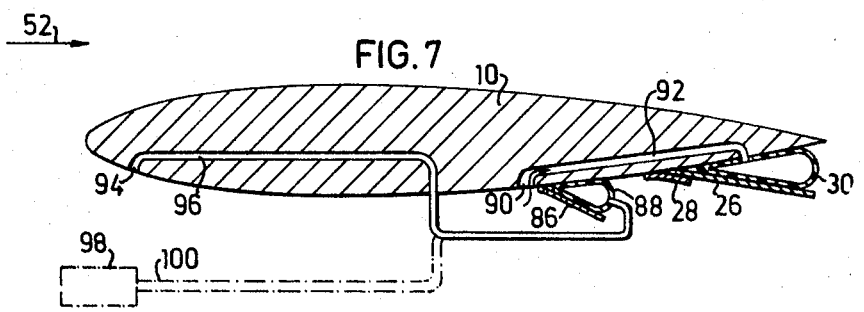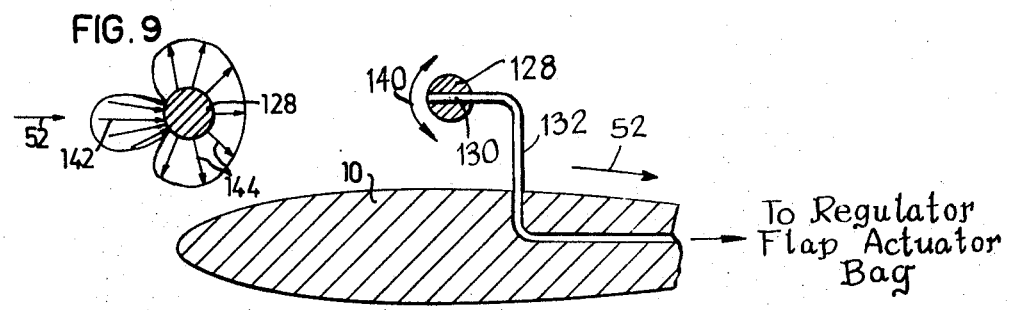

ARRANGEMENT IN AND RELATING TO AIRCRAFT

The present invention is concerned with aircraft provided with means which present a control surface, e.g. an adjustable flap intended for controlling and possibly also braking the aircraft under the influence of the airstream. The object of the invention is primarily to provide a servo operated mechanism adapted to facilitate adjustment of the control means.

A control surface functions as such by imparting to the air a momentum in a direction opposite to the desired control force direction. The reaction of the momentum imparted to the air is to increase the pressure on the control surface proper, which pressure attempts to move said control surface back to zero position. In conventional systems this is prevented by linkage systems directly controlled by the pilot or actuated by actuator mechanisms.

The invention is mainly characterized in that an actuator bag made of a flexible material and which can be inflated, either directly or indirectly, by the pressure of the air stream is actuatably connected with the control means so that said means can be adjusted by means of the actuator bag.

The greatest rise in pressure which the air stream can cause on the surface of an aircraft over and above the prevailing atmospheric pressure is equal to the dynamic pressure at undisturbed flow outside the flow field affected by the aircraft. This is the highest pressure which can be caused against the outside of the control surface. This force can be equalized on the inside of the control surface by means of an actuator bag of single cell or bellowlike structure. In the case of a single bag and rigid control surface a maximum angle of elevation about 25° is obtained while when employing a bellowlike structure presenting an infinite number of cells it is theoretically possible to realize an elevation angle of 90° since in this instance the total pressure from a pitot-tube facing the air stream is transmitted to the interior of the bag. The pressure in the bag thus becomes equal to atmospheric pressure increased by the dynamic pressure at undisturbed flow. The magnitude of the connection does not determine the resulting angle to which the control surface is elevated, but only the time taken to adjust the control surface to equilibrium. The increase in pressure which takes place at stagnation in the total pressure orifice of the pitot-tube can also be partially reached in front of a small flap which is elevated from the surface of the aircraft. Consequently, if an opening is arranged immediately in front of said flap the flap, which need only be some few diameters of the opening in width and length, can be used to select the pressure which is to prevail in a space enclosed as near to said opening as possible, for instance the aforementioned actuator bag.

The small flap, i.e. the control flap, can also be adjusted with the assistance of a bag and a pressure medium, preferably air, or by means of conventional remote control methods.

The actual control means, normally an adjustable flap, is in practice pivotally connected to the fuselage of the aircraft, and in the most simple application of the invention the actuator bag is attached completely, or at least substantially completely, behind the aforementioned pivoted connection. It is, however, also possible to position the actuator bag in front of the pivoted connection between a forwardly directed extension of the control means projecting into a groove in the fuselage of the aircraft and the said fuselage. It is known for the purpose of equalizing the pressure acting on a control surface to arrange a forwardly projecting extension of said surface within a wing on the aircraft, leakage between the upper and lower side of the extension being prevented by means of small slots or diaphragms. Pressurization of the two chambers thus formed is effected in that the gauge pressure or subpressure created by the control surface leaks in through the slots in front of the control surface in an uncontrolled manner.

Alternatively, to produce the necessary pressure in the actuator bag and for the purpose of controlling this pressure it is possible to arrange in the surface of the aircraft or in a sensing body attached to the fuselage thereof an opening which communicates with the interior of the bag, said opening being so positioned on a surface exposed to the air stream that said air stream creates therein local pressures which deviate from atmospheric pressure and which depend upon attack and yaw angles. The sensing body may for instance comprise a cylinder impinged upon by the air stream at right angles to its axis. When the opening is turned directly into the air stream a full dynamic pressure is obtained therein as a pressure rise relative to the atmospheric pressure.

As it is often desirable to maintain control work as low as possible it is convenient to employ several control flaps connected in series wherewith the control device can be arranged to control the smallest primary flap, and therewith the pressure to the actuator bag of a larger control flap, which in turn controls the pressure to the actuator bag of the control surface.

The invention will now be described with reference to the accompanying drawings, additional characteristic features thereof being disclosed in conjunction therewith. In the drawings FIG. 1 is a plan view of an airplane provided with control means according to the invention, FIG. 2 shows on an enlarged scale a cross section through the wing of an airplane and control means arranged thereon, FIG. 3 is a longitudinal section through the wing, taken transversely through a pitot-tube construction associated with the control means, said section being taken along the broken line 3–3 in FIG. 2, FIG. 4 is a cross section through a wing and a control means arranged thereon and conforming to a second embodiment of the invention, FIG. 5 is a longitudinal section through the wing of FIG. 4 taken in front of the control means shown therein as indicated by the line 5–5 in FIG. 4, FIG. 6 shows an aircraft wing provided with control means having selector valves according to a further embodiment of the invention, FIG. 7, similar to FIG. 6, shows an aircraft wing having modified control means, FIG. 8 shows an airplane wing having control means and rotatable sensing bodies, and finally FIG. 9 shows how the pressure of the air is distributed around a cylindrical sensing body.

In FIG. 1 there is shown an airplane provided with control means according to the invention on one wing and one side of the tail plane, although it should be understood that similar arrangements should be fitted to the other wing and on the opposite side of the tail plane. The wing 10 is shown provided with flaps at positions 12 and 14, the one 12 being nearer the wing tip than the other 14. The flap at position 12 is provided with control surfaces, both on the top and bottom thereof, although it can be imagined to present a control surface on only one of its two sides. The flap at position 14 is a landing flap which in the example of FIG. 1 has not been fitted with control means. The reference numeral 16 identifies a control or regulating member which may comprise a flap having an actuator bag and an air pressure intake. Leading from said member 16 to the actuator bag or bags of the control flap 12 is a pressure line 18. A line 20 passes from the bag of the control member 16 to a control device 22 positioned in the vicinity of the pilot's seat. The flap on the tail plane and presenting a control surface according to the invention is identified by the reference numeral 24.

Figure 2:
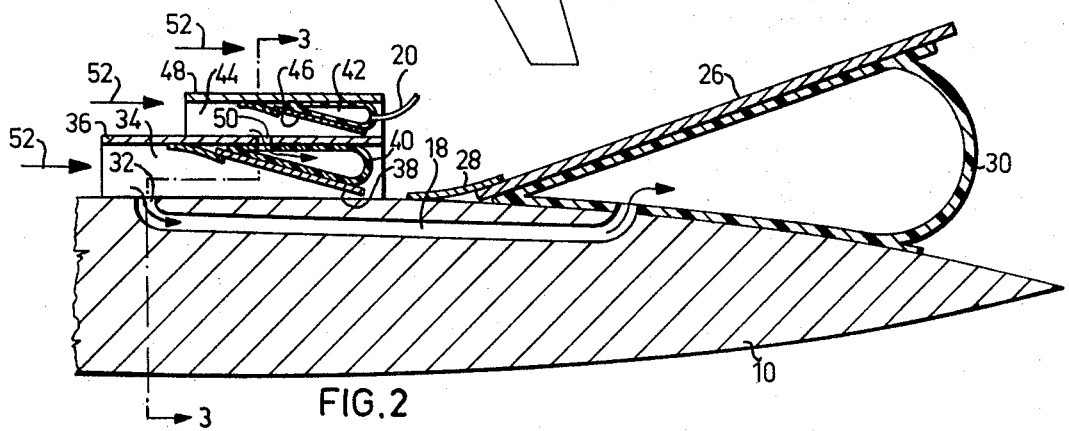

In the embodiment shown in FIG. 2 the control surface 26 is in the form of a rigid flap which is pivotally connected by a flexible strap 28 or the like to the upper surface of the wing 10 so that said flap can be swung up and down in relation to said wing. The flap is adjusted by servo forces obtained by the air stream. For this purpose there is provided an actuator bag 30 having walls of a flexible material. The shape of the actuator bag conforms to the shape of the conical space between the flap 26 and the top of the wing 10. The interior of the actuator bag 30 communicates with an air intake 32 via a pressure passage corresponding to the line 18 in FIG. 1, said air intake being arranged in the upper surface of the wing within a passage 34 which is open at the front and rear end thereof and which extends in the transverse direction of the wing. This passage, the wall of which is designated 36, acts as a pitot-tube. The pressure in the air intake 32 and the passage 18 to the actuator bag 30 can be adjusted by means of a regulator flap 38 which is arranged within the pitot-tube passage 34 to close the through-passage thereof to a greater or lesser extent. The regulator flap is operated by means of an actuator bag 40, in this instance arranged as an auxiliary bag to a primary bag 42 which in turn is located in a pitot-tube passage 44 and actuates a primary flap 46 in said passage. The pressure of the air stream in the pitot-tube passage 44 is transferred through an opening 50 in the wall 48 of the pitot-tube passage to the interior of the auxiliary bag 40, and this pressure is regulated by the action of the pressure in the primary bag 42 which communicates with the control member in the pilot's seat via the line 20. When the regulator flap 46 is set to the desired position by means of the primary bag 42 the pressure of the air stream is regulated in the opening 50 by means of the control member so that the auxiliary bag 40 is inflated and adjusts the secondary flap 38. In this way the air pressure in the air intake 32 and the line 18 to the primary bag 30 is regulated. This in turn sets the control flap 26 so that the airplane obtains the necessary control impulse. In that two control means 42, 46 and 40, 38 are arranged in series with the bag 30 in the main flap 26 only a small operating force is required while a large servo force is obtained. It is often sufficient, however, to arrange only one regulator flap in combination with the actuator bag of the control surface.

Figure 3:
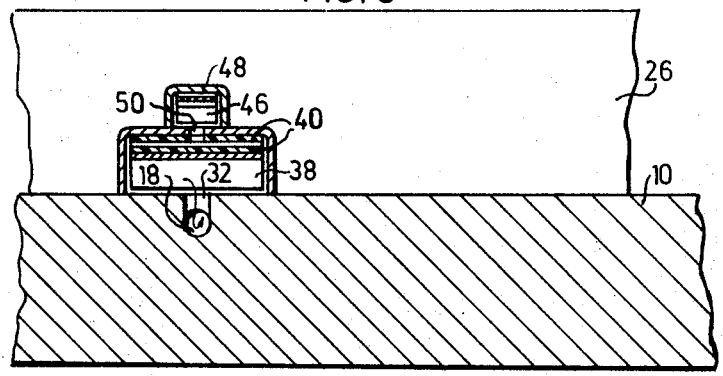

In the embodiment shown in FIGS. 4 and 5, in which the air stream has been marked with arrows 52 as in FIGS. 2 and 3, the actuator bag 30 is also located on the rear portion of the wing 10 by the flexible joint which is formed by the strap 28 between the control surface 26 and the aircraft wing. In the embodiment shown in FIGS. 4 and 5 no pitot-tube passages are arranged, there being provided instead in the actual control flap 26 and the actuator bag 30 an opening 54 through which air can pass into the actuator bag 30 and inflate the same as a result of the pressure of the air stream. The pressure at the opening 54 and thus inflation of the actuator bag can be varied by means of a regulator flap 56 which is connected with the control surface 26 by means of a link plate or the like 58. Located between the regulator flap 56 and the control surface 26 is a secondary or servo bag 60 which communicates with the outer air via an opening 62 in the regulator flap 56. The pressure of the air stream outside the opening 62 can be adjusted by means of an operating flap 64 which is pivotally connected with the regulator flap 56 and at 66, and which can be set by means of a primary or actuator bag 68. The extent to which bag 68 is inflated can be varied for the purpose of adjusting the actuator flap 64, and to these ends a line 70 passes to a control device in the vicinity of the pilot's seat. Transmission of control can also be effected mechanically or electrically. As with the embodiments of FIGS. 2 and 3 the control work necessary in the arrangement shown in FIGS. 4 and 5 having series-connected or stacked control devices is slight. Only small forces are required to actuate the small actuator bag 68, and hence the operating flap 64 can easily be set to different positions in relation to the control flap 56 so that the pressure in the opening 62 of the primary bag 60 can be regulated, and said bag in turn sets the control flap 56 to the desired position in relation to the control surface 26. In this way the desired pressure in the actuator bag 30 is obtained with small pressure requirements since the control flap 56 is set to adopt positions corresponding to the pressure required in the opening 54 in front of said flap to cause the actuator bag 30 to set the control surface to the intended position.

In FIG. 6 is shown the wing 10 of an aircraft having an actuator bag and a flap which serves as a control surface and which is pivotally connected to the wing by a flexible strap as in the previously described embodiments. At the leading edge of the wing is disposed a pressure opening 70 at a position where the air stream creates a subpressure indicated by arrows 72, and a pressure opening 74 at a position where positive or gauge pressure prevails, indicated with arrows 76. A passage 78 extends from the pressure opening 70 to a selector valve 80, and another passage 82 extends from the pressure opening 74 to the same selector valve. Extending from said valve is a line or passage 84 to the actuator bag. The pressure in the passage 84 can be varied by setting the selector valve so that the actuator bag is dilated to a greater or lesser degree, thereby setting the control surface.

In the embodiment shown in FIG. 6 a relatively slow reaction and setting of the control surface is obtained upon actuating movement of the selector valve. A more rapidly functioning device is illustrated in FIG. 7 which shows an automatically functioning landing flap. This embodiment includes the actuator bag 30 and a main control flap 26 with its pivot 28 located on the under surface of the wing 10. Positioned in front of the main control flap, which is intended to extend along a major portion of the length of the wing, is a control flap 86 presenting but small extensions in relation to that of the main control flap. The control flap 86 is set by a small actuator bag 88 and the control flap is arranged immediately behind a pressure intake 90 from which a passage 92 leads to the actuator bag 30. Positioned in front of the under surface of the wing, where in the case of large attack angles a gauge pressure prevails whilst conversely in the case of low attack angles a subpressure prevails, is an air intake 94 which is connected through a passage 96 to the actuator bag 88. The pressure in passage 96, and thereby in the actuator bag 88, is varied automatically. Alternatively, the landing flap can be regulated by actuating the flap 86 by a control device 98 in the cockpit. This is indicated by phantom lines in FIG. 7 as is also a line 100 between the control device and the passage 96.

In the embodiments described heretofor an opening has been arranged in the surface of the aircraft for the purpose of creating the necessary pressure in the actuator bag, the opening communicating with the interior of the bag and being located on a surface exposed to the air stream created by the aircraft in such position that the air stream creates in said opening local pressures deviating from atmospheric pressure and depending upon attack and yaw angles. In these embodiments the variations in pressure, however, have chiefly been caused by regulator flaps of different design and arranged in different ways. It is also possible, however, as is evident from FIG. 8, to create variations in the pressure in the actuator bag by means of a rotatable sensing body in which an opening is arranged so that it can be set to adopt different positions in relation to the course of the aircraft. In FIG. 8 the rotatable sensing body is identified by the reference numeral 128 and the opening by 130. A passage 132 extends from the opening 130 to an actuator bag 136 which adjusts a control flap 136 pivotally connected with the wing 10 by means of a flexible strap as in any of the preceding embodiments. As indicated by the double arrow 140 the sensing body can be rotated from the shown position where the opening is directed straight into the air stream to positions in which it extends more or less obliquely to said air stream. The sensing body of FIG. 8 is shown in the form of a cylinder, and FIG. 9 shows how the air pressure is distributed around such a body. The direction of the air flow is indicated by arrows 52, and the arrows 142 show the pressure on the front side of the sensing body while the arrows 144 show the subpressure on the sides and the trailing edge of the sensing body. When the opening 130 faces into the air stream, the full dynamic pressure is obtained therein as pressure rise relative to the atmospheric pressure. If the opening is turned in either direction, a pressure drop below atmospheric pressure is obtained.

It has been assumed in the aforegoing description of the different embodiments that the control surface is attached to the wing of an aircraft, although the invention is not limited to this positioning of the surface, which can be placed in any position on the fuselage of an aircraft where a control surface is necessary.

I claim:

1. In an aircraft having a control surface swingable relative to the aircraft to control the attitude of the aircraft and a flexible actuator bag disposed between a portion of the aircraft and the control surface to swing the control surface; the improvement in which the control surface has an opening therethrough that registers with an opening through the actuator bag to provide communication between the interior of the actuator bag and the air stream flowing over the control surface, a regulator flap pivotally mounted on the control surface behind the opening in the control surface with respect to the direction of the air stream, and means for swinging said regulator flap relative to said control surface.

2. Apparatus as claimed in claim 1, and an actuator bag between said regulator flap and said control surface, and means for selectively inflating the last-named actuator bag.

3. Apparatus as claimed in claim 2, said means for selectively inflating the regulator flap actuator bag comprising an opening through said regulator flap registering with an opening through said regulator flap actuator bag to provide communication between the interior of the last-named bag and the air flowing over said regulator flap, a second regulator flap pivotally mounted behind the opening in the first-named regulator flap, and means for selectively swinging said second flap.

4. Apparatus as claimed in claim 3, said means for selectively swinging said second flap comprising a second regulator flap actuator bag mounted between said first and second flaps.

5. In an aircraft having a control surface swingable relative to the aircraft to control the attitude of the aircraft and a flexible actuator bag disposed between a portion of the aircraft and the control surface to swing the control surface; the improvement in which the interior of said bag communicates through an opening with the air stream flowing over said control surface, a regulator flap pivotally mounted behind said opening with respect to the direction of the air stream, a regulator flap actuator bag mounted on the side of said regulator flap opposite the air stream, and means for selectively inflating the regulator flap actuator bag.

6. Apparatus as claimed in claim 5, said opening being disposed in a surface of the aircraft separate from said flap and control surface so that air flow creates a pressure in said opening in dependence on the angle of attack or yaw of said aircraft surface.